United States Patent [19] [11] 4,368,654
Kober et al. [45] Jan. 18, 1983

[54] ADJUSTABLE STRIPPING TOOL
[75] Inventors: Marvin Kober, Spring Valley; Eugene Battaglia, New York, both of N.Y.
[73] Assignee: O. K. Machine and Tool Corp., Bronx, N.Y.
[21] Appl. No.: 237,512
[22] Filed: Feb. 23, 1981
[51] Int. Cl.³ .............................................. H02G 1/12
[52] U.S. Cl. ................................................. 81/9.5 R
[58] Field of Search .............. 81/9.5 R, 128; 30/90.1; 29/278, 280, 283; 279/41, 43; 254/18

[56] References Cited
U.S. PATENT DOCUMENTS

| 58,306 | 9/1866 | Sedgwick | 81/128 |
|---|---|---|---|
| 453,168 | 5/1891 | Franklin | 279/41 X |
| 1,566,297 | 12/1925 | Williams | 30/90.1 X |
| 3,352,996 | 11/1967 | Neumeier | 279/43 X |
| 3,724,299 | 4/1973 | Nelson | 81/128 |
| 3,733,626 | 5/1973 | Allen | 81/9.5 R X |

FOREIGN PATENT DOCUMENTS

| 2517873 | 4/1975 | Fed. Rep. of Germany | 81/9.5 R |
|---|---|---|---|
| 1187927 | 4/1970 | United Kingdom | 81/9.5 |

Primary Examiner—Stephen G. Kunin
Assistant Examiner—Debra S. Meislin

[57] ABSTRACT

An adjustable wire stripping hand tool having spaced stripping blades mounted on the ends of a bifurcated split housing. A drive mechanism is provided within the housing for selectively increasing and decreasing the spreading of the split ends to control the blade spacing. A rotatable dial actuates the drive mechanism and simultaneously indicates dial positions for various wire sizes.

10 Claims, 6 Drawing Figures

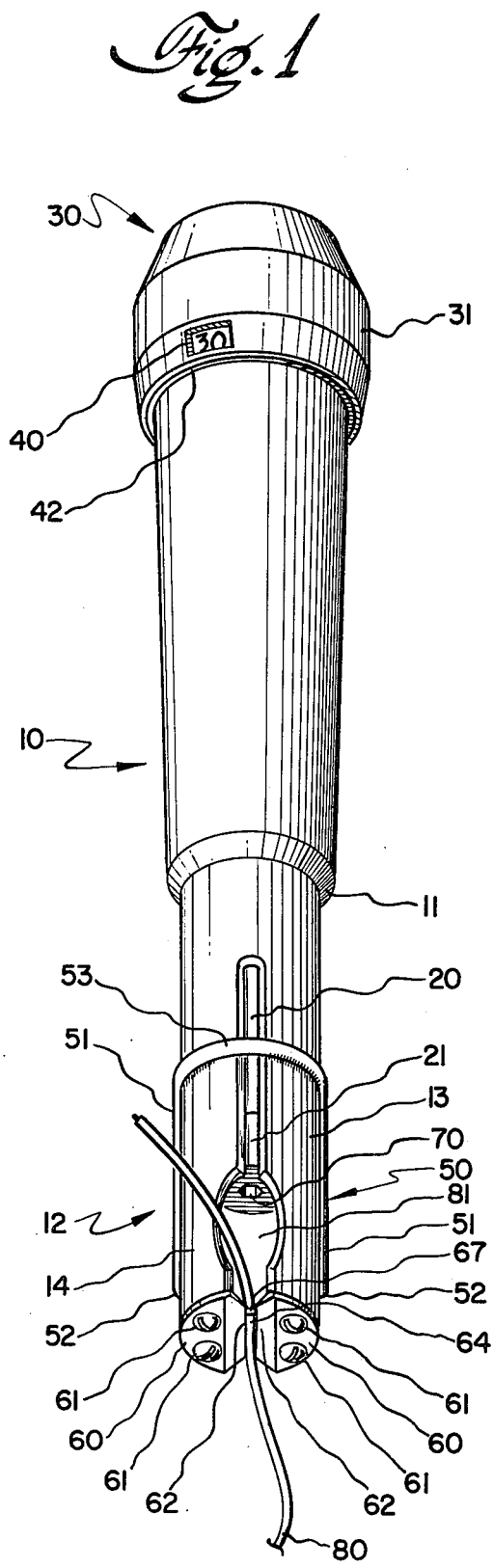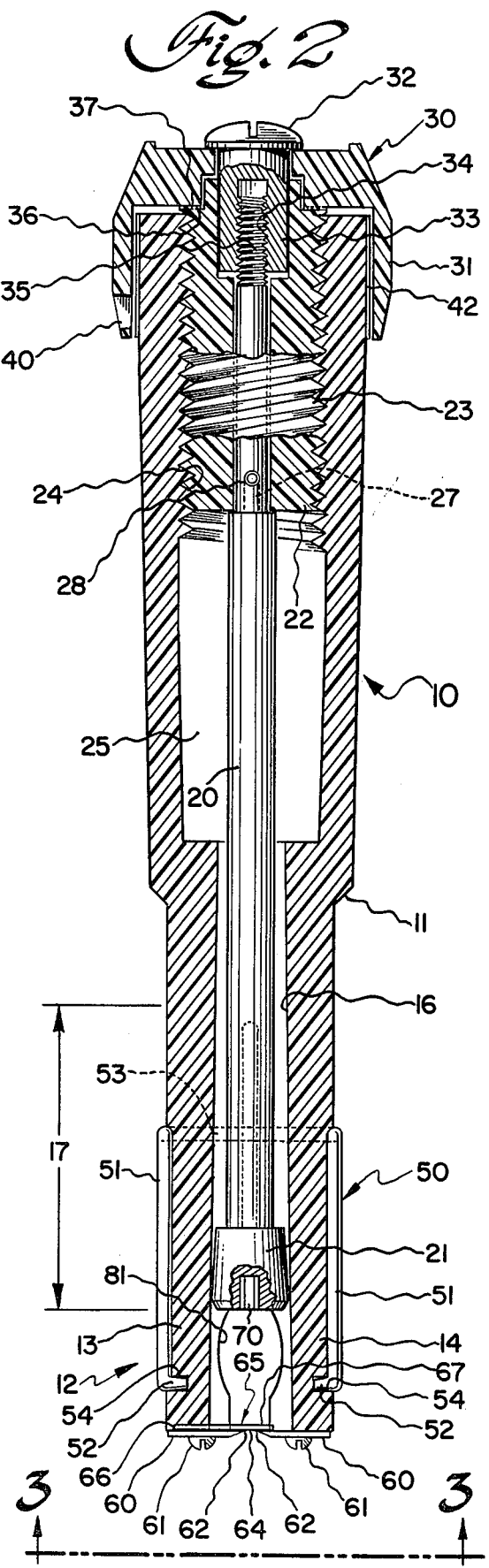

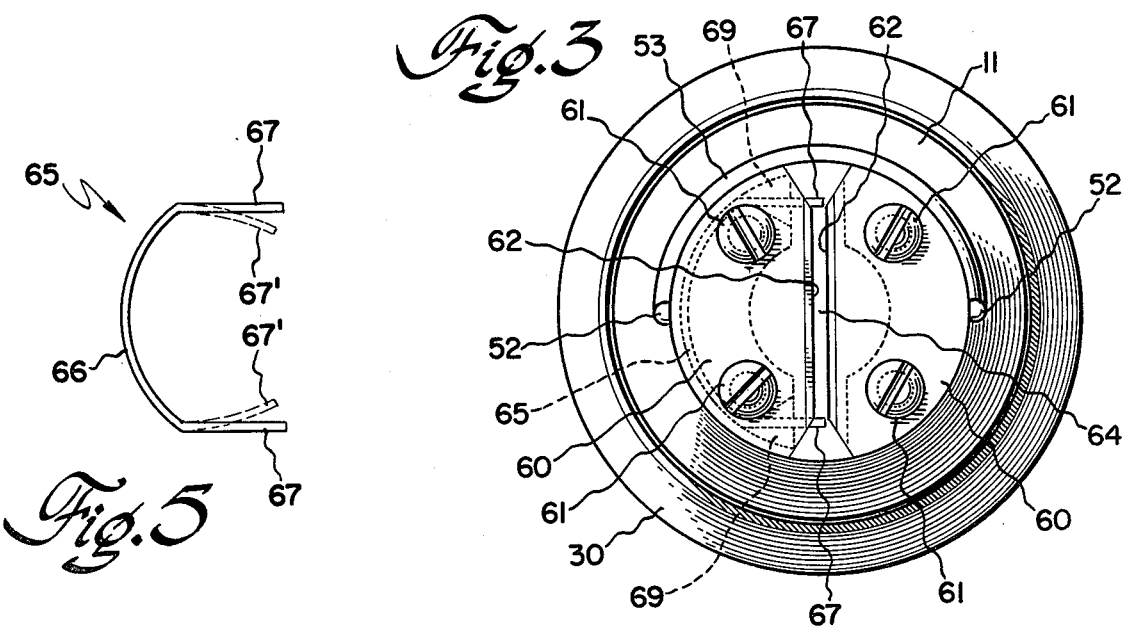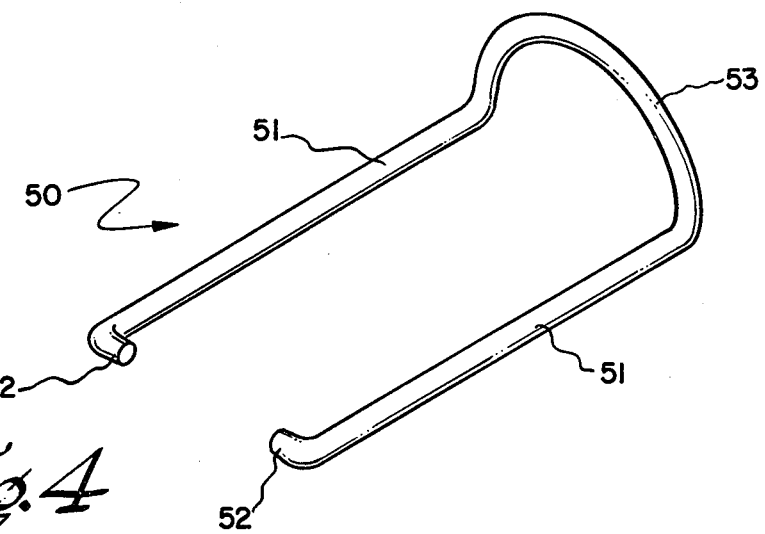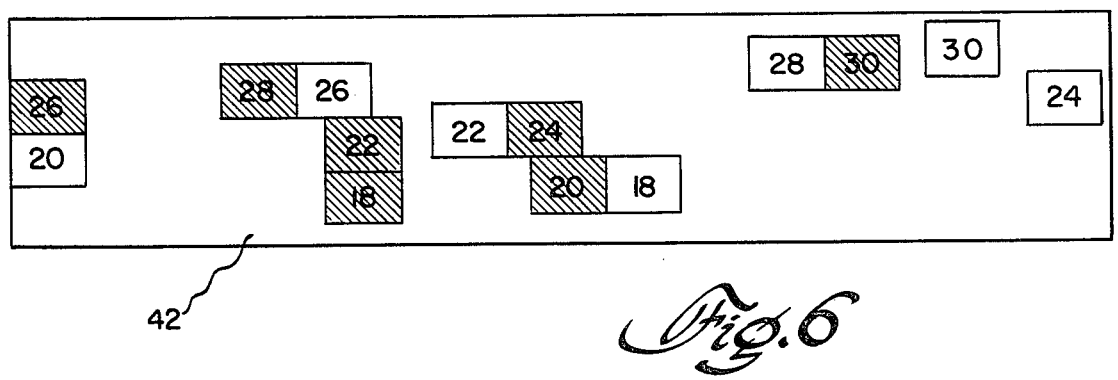

ADJUSTABLE STRIPPING TOOL

This invention relates to an electrical-wire stripping tool, and in particular to a manual stripping tool with an adjustable stripping slot.

BACKGROUND OF THE INVENTION

Commonly-assigned U.S. Pat. No. 3,881,248 describes and illustrates in FIGS. 9 and 10 a hand-held stripping tool comprising a flat plate having a plurality of U-shaped stripping slots each dimensioned to receive a differently sized insulated wire which upon rotation of the tool will slit through the insulation so that upon pulling of the wire through the slot the insulation can be stripped off from the wire end. Since the lateral dimension of each slot is fixed, a differently-dimensioned slot is needed for each wire-size intended for stripping.

The chief object of the invention is a novel stripping tool with a single slot defined by stripping blades whose spacing can be adjusted by the user, with the result that the tool is capable of stripping the insulation from a plurality of differently sized wires.

Another principal object of the invention is a novel stripping tool capable of stripping the insulation from stranded or solid electrical wire, and from odd (non-standard) wire sizes.

BRIEF DESCRIPTION OF THE INVENTION

These and other objects of the invention are realized by a novel stripping tool characterized by a pair of stripping blades having facing cutting edges whose spacing can be adjusted by the user and which determines the wire size that can be stripped.

In a preferred embodiment, the stripper blades are mounted on a split housing and are biased toward one another. Means are provided for spreading the split housing to selectively increase and decrease the spacing between the split ends.

A feature of the invention is to employ a rotatable member to spread the split housing, and to provide a dial readout by wire gauge numbers for setting the desired stripping blade spacing.

A further feature of the invention is to provide means adjacent the stripping blades to allow entry or removal of a wire between the stripping blades, while at the same time preventing the wire during use of the tool from sliding out from between the blades. This feature enables stripping of, for example, TEFLON insulated wire, which is extremely slippery and difficult to strip.

BRIEF DESCRIPTION OF DRAWINGS

These and other features and advantages of the invention will become apparent from the following detailed description of a preferred embodiment taken in conjunction with the annexed drawings, of which:

FIG. 1 is a perspective view of one form of tool in accordance with the invention, with a wire shown in position ready for stripping;

FIG. 2 is a cross-sectional view along the central axis of the tool of FIG. 1;

FIG. 3 is an end view along lines 3—3 of the tool of FIG. 1;

FIG. 4 is a perspective view of the housing retaining spring used in the tool of FIG. 1;

FIG. 5 is a top plan view of the wire stop spring used in the tool of FIG. 1;

FIG. 6 is an expanded view of the wire size band used in the tool of FIG. 1 for providing the dial readout of wire gauges.

DETAILED DESCRIPTION OF PREFERRED EMBODIMENT

FIGS. 1 and 2 of the drawings are, respectively, perspective and cross-sectional views of a preferred embodiment of the adjustable stripping tool of the invention, comprising an elongated handle-like structure adapted to be manually held by a user. The tool comprises a one-piece housing 10 which is essentially cylindrical in nature about a central axis. The tool as shown is drawn approximately to scale and has typically an overall length of about five inches and a diameter at its left end of about ¾ inches. From the top end, the body tapers gradually to the center, reduces in diameter at a shoulder 11, and the remainder to the bottom is cylindrical, except that over approximately ⅔ of the length of the cylindrical part it is split throughout its diameter to form a bifurcated end, indicated generally by 12, composed of two leg portions 13, 14. The split end allows the legs 13, 14 to be spread apart laterally (transverse to the longitudinal central axis). The spreading is accomplished in this preferred embodiment by providing a tapered hole 16 extending along the center of the tool housing 10 and which tapers slightly outwardly between the two dashed lines designated 17.

A cylindrical rod 20 having an enlarged end 21 which also has a slight outward taper is positioned within the center tapered hole 16. The tapers are such that movement of the rod end 21 to the top of FIG. 2 increases the lateral spread between legs 13, 14, whereas rod end movement to the bottom of FIG. 2 decreases the spread as will be explained below. An example of the hole 16 and rod end tapers is 1°30′ and 1°45′, respectively. It is preferred that the hole taper is smaller than the rod taper so that the hole taper controls the leg spread. The difference in tapers results in essentially point contacts between the widest part of the rod end 21 and the hole 16.

The adjusting rod 20 is moved axially through the tool by a cylindrical driver member 22 having an outer thread 23 which threadingly engages a matching thread 24 on the inside surface of a cylindrical inner space 25 formed within the wider top end of the handle-shaped housing 10. A transverse slot 27 is provided at the driver end facing the bifurcated tool end, and the adjusting rod 20 is provided with a transverse pin 28 which is press-fitted through the rod and whose projecting ends engage the driver slot 27. Rotation of the driver 22 clockwise will displace it and the rod 20 to which it is affixed to the bottom of FIG. 2. Counterclockwise rotation will reverse the displacement. The rod 20, of course, rotates with the driver 22 as it is displaced axially.

A cylindrical rotatable knob 30 fits over the end of the housing as shown, and is provided with a forwardly projecting (to the bottom of FIG. 2) sleeve portion 31 which extends over the rearward or top end of the housing 10. A locking screw 32 is provided with an inwardly projecting hub 33 having a threaded opening 34 adapted to be threadingly engaged by a matching thread 35 on the top end of the adjusting rod 20. The locking screw 32, as shown, secures the knob 30 to the driver 22 and adjusting rod 20. To assure that the knob 30 does not rotate relative to the driver 22, i.e., the knob 30 is fixed to driver 22, serrations (not shown) are provided on the facing surfaces 36, 37 of the knob 30 and driver 22, which serrations engage one another in the assembled condition of the tool.

A window 40 (FIG. 1) is provided in sleeve portion 31 of the knob 30. Between the sleeve portion 31 and the underlying outside cylindrical wall of the housing 10 is mounted, as by gluing, a wire size cylindrical band 42. FIG. 6 shows the band laid-out flat in expanded position. As will be observed, it contains a series of indicia in the form of numbers in rectangular boxes designating wire gauge or size numbers 18–30. The uncross-hatched boxes would be in a first color, as for example yellow, and the hatched boxes in a second color, as for example blue. Suitable markings located for example on the end surface of the knob 30 would inform the user that the yellow boxes are to be used when stripping solid wires, and the blue boxes when stripping stranded wire. The window 40 is located so as to expose individual size designations when rotated. In FIG. 1, the window is shown located over the uncross-hatched box with the numeral 30 showing through.

A spring clip 50 is mounted over the tool bifurcated end to bias legs 13, 14 toward one another. As shown more clearly in FIG. 4, the spring clip 50 is generally U-shaped with arms 51 having inwardly projecting ends 52, and a raised bight portion 53. As illustrated in FIG. 1, the spring clip bight portion 53 fits over and across the split tool end, the clip arms 51 lay alongside the sides of the housing legs 13, 14, and the clip is anchored to the housing by seating of the inwardly projecting ends 52 into small holes 54 at the leg ends. The clip 50 is tensioned to push the housing legs 13, 14 toward one another and against the rod end 21.

The bottom end of the housing legs is flat and extends in a plane perpendicular to the tool axis, and on those flat surfaces serving as mounting sites are mounted a pair of stripping blades 60, each, for example, by two screws 61 (see FIG. 3). The facing edges 62 of the blades 60, which are parallel, are sharpened to form insulation cutting edges. The spacing between the parallel cutting edges 62 determines the wire size to be stripped and constitutes the stripping slot spacing 64. A stop spring 65 is mounted with its bight portion 66 under the blade mounting screws 61 between the blade and the housing flat surface, with the stop spring arms 67 extending under and across the space between the blade cutting edges 62. The stop spring 65 seats in a shallow groove 69 (FIG. 3) formed in the flat mounting site for the left blade 60. The solid outline in FIG. 5 shows the unbiased spring 65. The dashed lines 67' show how the spring arms can flex when the wire is inserted. The groove 69 ends are widened to allow spring arm movement.

After the tool is assembled, with locking screw 32 loose, calibration is carried out to ensure that the blade spacing 64 is correct for the window settings in the knob. This is accomplished as follows. The knob 30 is rotated until the window 40 is approximately lined up with one of the wire numbers on the band 42, say yellow 30. Then the rod 20 is rotated until the yellow 30 is exactly even with the window, and the screw 32 tightened. The rod is rotated when assembled by providing a hex opening 70 in the rod end and engaging same with an Allen key through the bifurcated tool end (before assembly of the blades). The, the stripper blades 60 are mounted with a 0.009 inch shim located between the cutting edges which defines the spacing 64 for stripping AWG 30 solid conductor without nicking the wire, corresponding to the yellow 30 visible through the window. The setting shim size is chosen to allow for the elasticity of the wire insulation. The wire size numbers on the band 42 are positioned such that as the knob is rotated to align the window 40 with different wire size numbers, the rod end 21 is displaced axially to increase or decrease the spacing between the cutting edges 62, by increasing or decreasing the spreading of legs 13, 14, to match the diameter of the stranded or solid conductor of the insulated wire. After the setting has been dialed in by the user, the user inserts the wire, designated 80 in FIG. 1, sideways between the cutting edges 62 (from the top or bottom in the end view shown in FIG. 3), pushing the wire past the nearest stop spring arm 67 which is flexible enough to allow the wire to pass, until the wire is positioned between the arms 67, this action cutting through the sides of the insulation, and then while holding the wire, the tool is rotated 360° cutting completely around and through the insulation, and then the wire pulled out from between the stripping edges stripping off the insulation. The sides of the legs 13, 14 are hollowed out as shown at 81 to make it easier for the insulation to fall out or be pushed out by the user.

The tool parts may be constructed of various materials. The springs, blades and rod are preferably of metal. The remaining parts can be of a suitable plastic, a polycarbonate such as LEXAN being suitable.

The described tool has many advantages, some of which are noted below:

1. The main part of the housing 10 is constructed as a single piece for low cost manufacture, although it allows the stripping slot to be defined by two separate stripping blades 60 which can be identical and which can be removably mounted on the housing end at the flat mounting sites as shown. This allows easy replacement of the stripping blades should the edges become damaged or worn. This further permits accurate parallel alignment and spacing of the cutting edges which ensures proper stripping of the insulation without nicking of the wire.

2. The constant inward biasing of the bifurcated ends imparted by the spring clip 50 against the wedging action of the rod tapered end prevents spreading of the bifurcated end when the wire is inserted and eliminates any load or impact on the wire size setting mechanism thereby assuring that the stripping blade spacing 64 remains accurately related to the dial setting during the life of the tool.

3. The cooperating taper mechanism of the housing and rod to control the blade spacing enables the use of a single set of stripping blades for varying wire sizes. In addition to providing ease of adjustment for different wire sizes by simple rotation of the knob to the position desired, adjustment is precise over a stepless range within the total range of the tool. This permits, as indicated, stripping of solid as well as stranded conductor wire, and even of odd wire sizes not defined by the standard AWG wire gauge numbers without fear of nicking the conductor.

4. Dial readout allows simple precise reproducible settings by the user for different wire sizes. Use of color identification enable simple user use to distinguish between stranded and solid wire settings.

5. The stop means 65 in the form of a wire spring extending across both sides of the stripping slot 64 allows the wire end to be moved in either direction for easy insertion into or removal of the wire from the stripping slot, while at the same time preventing the wire from sliding out during rotation of the tool. This is especially important for stripping TEFLON insulated wires, which is extremely slippery and difficult to strip. Since the TEFLON insulation is typically more elastic than other more common insulators with which the tool can be used, such as PVC, KYNAR or TEFZEL, generally a smaller setting is needed for stripping TEFLON, and it is also desirable to rotate the tool about 5 times in order to cut through the TEFLON insulation. A few trial and error experiments will enable the user to determine the exact dial setting for TEFLON insulated wires.

6. As will be evident, upon rotation of the tool, the insulation is cut through over a full circle thereby making it easier to strip off. This, again, is especially beneficial for TEFLON insulation. In some known wire strippers, normal use of the tool only results in parallel cuts through opposite sides of the insulation.

7. The overall simple construction and few parts lends itself to economical manufacture.

It is also possible to place suitable indicia on the housing to indicate the length of the stripped wire end. This is easily accomplished by mounting a scale in inches or millimeters on the side of one or both of the bifurcated legs 13, 14. The scale will start at zero at the location of the stripping blades, and increase toward the knob end of the tool. Should the stripped length exceed the spacing between the rod end 21 and the stripping slot 64, the free wire end or tail can be extended out through the slot in the bifurcated end.

Variations of the described preferred embodiment within the principles described above will be evident to those skilled in the art. For example, both the housing hole and rod need not be tapered. A single taper, preferably on the housing, should be operative. Also the coupling of the knob to the rod via the driving member can be replaced by other equivalent coupling mechanisms. Still further, the wire size indicia can be placed underneath the outer end of the knob, rather than underneath its sleeve, or as a further alternative, the wire size numbers can be located on the rotatable dial or knob for cooperation with a fixed mark or marks on the housing.

While our invention has been described in connection with specific embodiments thereof, those skilled in the art will recognize that various modifications are possible within the principles enunciated herein and thus the present invention is not to be limited to the specific embodiments disclosed.

What is claimed is:

1. An adjustable wire stripping tool comprising a handle-shaped housing member having a longitudinal axis and having a bifurcated end forming portions that are laterally spaced and laterally displaceable with respect to the said longitudinal axis, said laterally displaceable portions each having a site for receiving a stripper blade, a pair of stripper blades each having a cutting edge and each mounted on one of the receiving sites with its cutting edge facing and extending substantially parallel to the cutting edge of the other blade, the spacing between the facing cutting edges determining the wire size that can be stripped by a user of the tool, means mounted on the housing adjacent the bifurcated end for exerting a continuous biasing force urging the laterally displaceable portions toward one another and thus tending to narrow the cutting edge spacing, means on the housing and operatively connected to the housing bifurcated end under control of the user for continuously applying a lateral force after release by said user tending to spread apart the laterally displaceable portions against the action of the biasing force exerting means and for selectively varying and setting the spacing between the cutting edges to enable differently sized wires to be stripped by differently set cutting edge spacings, and means connected to the spacing varying means for indicating the set spacing dimension and thereby the size of the wire for which the tool has been set to be stripped.

2. An adjustable wire stripping tool as claimed in claim 1 wherein the spacing varying means comprises means for continuously wedging apart the spaced mounting sites against the continuous action of the biasing means.

3. An adjustable wire stripping tool as claimed in claim 1 wherein the indicating means include dialing means connected to the spacing varying means for actuating the latter and for simultaneously indicating the spacing dimension that has been set.

4. An adjustable wire stripping tool as claimed in claim 1 wherein the bifurcated end has a generally cylindrical hole, and the spacing varying means comprises a rod extending within the hole forming with the bifurcated end hole a cooperating tapered generally cylindrical section with the rod mounted for longitudinal axial displacement within the bifurcated end hole for selectively increasing and decreasing by lateral wedging the spreading of the bifurcated end, said stripper blade mounting sites extending in a common plane perpendicular to the longitudinal axis.

5. An adjustable wire stripping tool as claimed in claim 4 and further comprising a rotatable driving member mounted within the housing and connected to the rod, and an external knob operable by the user and coupled to the driving member for rotating the latter to thereby axially displace the rod.

6. An adjustable wire stripping tool as claimed in claim 5 wherein said indicating means has indicia indicating different wire sizes and is mounted on the housing, and means on the knob cooperating with the indicating means for setting the knob position to a desired wire size.

7. An adjustable wire stripping tool as claimed in claim 1 wherein the stripping blades are substantially identical and are removably mounted on the housing.

8. An adjustable wire stripping tool as claimed in claim 1 and further comprising stop means mounted on the housing adjacent the cutting edge space for preventing the wire from slipping laterally out of said space during operation of the tool.

9. An adjustable wire stripping tool as claimed in claim 8 wherein said stop means comprises a generally U-shaped flexible, resilient wire mounted between the stripping blades and its mounting sites in a plane parallel thereto with the wire ends crossing the cutting edge space.

10. An adjustable wire stripping tool as claimed in claim 1 wherein the biasing means comprises a generally U-shaped resilient wire member mounted over the bifurcated end.

* * * * *